(12) United States Patent
Henion et al.

(10) Patent No.: US 8,047,665 B2
(45) Date of Patent: Nov. 1, 2011

(54) REARVIEW MIRROR ASSEMBLY HAVING A COMPOSITE REFLECTIVE SURFACE

(75) Inventors: Paul R. Henion, Port Huron, MI (US); Michael E. Karpus, Macomb Township, MI (US); Gary J. Sinelli, Birmingham, MI (US); Kevin D. Bower, Macomb Township, MI (US); Anthony P. D'Andrea, Attica, MI (US)

(73) Assignee: SMR Patents S.a.r.l., Luxembourg (LU)

( * ) Notice: Subject to any disclaimer, the term of this patent is extended or adjusted under 35 U.S.C. 154(b) by 44 days.

(21) Appl. No.: 12/484,661

(22) Filed: Jun. 15, 2009

(65) Prior Publication Data

US 2010/0315732 A1 Dec. 16, 2010

(51) Int. Cl.
B60R 1/08 (2006.01)

(52) U.S. Cl. ............... 359/864; 359/883; 248/467
(58) Field of Classification Search .......... 359/838, 359/864, 866, 883; 248/467
See application file for complete search history.

(56) References Cited

U.S. PATENT DOCUMENTS

| | | | | | |
|---|---|---|---|---|---|
| 3,044,359 | A | * | 7/1962 | Zanetti-Streccia | 359/866 |
| 3,170,985 | A | * | 2/1965 | Katulich | 359/864 |
| 3,389,952 | A | * | 6/1968 | Tobin, Jr. | 359/864 |
| 4,859,046 | A | * | 8/1989 | Traynor et al. | 359/866 |
| 5,579,133 | A | * | 11/1996 | Black et al. | 359/866 |
| 5,796,532 | A | * | 8/1998 | Kanazawa | 359/858 |
| 6,522,451 | B1 | | 2/2003 | Lynam | |
| 7,044,612 | B2 | * | 5/2006 | Centmayer et al. | 359/876 |
| 7,080,913 | B2 | * | 7/2006 | Henion et al. | 359/864 |
| 7,126,456 | B2 | | 10/2006 | Boddy et al. | |
| 7,287,867 | B2 | | 10/2007 | Wellington et al. | |
| 7,572,020 | B2 | | 8/2009 | Henion | |
| 2002/0072026 | A1 | * | 6/2002 | Lynam et al. | 432/77 |
| 2009/0040306 | A1 | * | 2/2009 | Foote et al. | 348/148 |
| 2009/0174959 | A1 | * | 7/2009 | Sinelli et al. | 359/864 |
| 2010/0202072 | A1 | * | 8/2010 | Ferman et al. | 359/850 |

* cited by examiner

Primary Examiner — Mark Consilvio
(74) Attorney, Agent, or Firm — Reising Ethington P.C.

(57) ABSTRACT

An exterior rearview mirror assembly for a motor vehicle includes a housing defining an interior and including a mirror opening oriented rearward when the exterior rearview mirror assembly is secured to the motor vehicle. A backing plate is operatively connected to the housing in the interior. The backing plate is selectively moveable within the housing. A primary mirror is fixedly secured to a first portion of the backing plate. A secondary mirror is fixedly secured to a second portion of the backing plate. The secondary mirror is spaced apart from the primary mirror. An adhesive member extends between the backing plate and the primary and secondary mirrors such that the single adhesive member secures all of the primary and secondary mirrors to the backing plate. A demarcation divider separates the primary and secondary mirrors. The demarcation divider is secured to the backing plate.

9 Claims, 5 Drawing Sheets

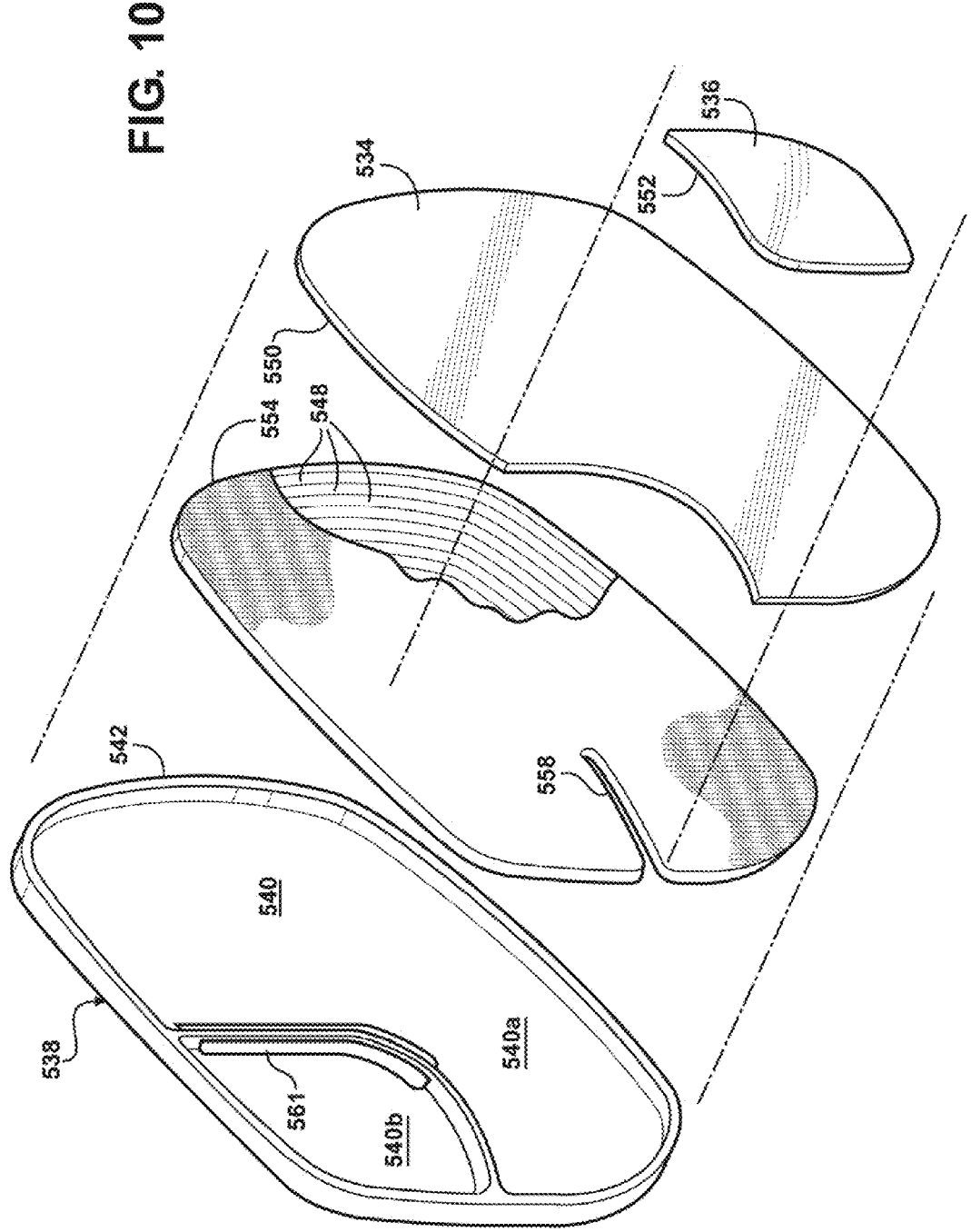

REARVIEW MIRROR ASSEMBLY HAVING A COMPOSITE REFLECTIVE SURFACE

BACKGROUND ART

1. Field of the Invention

The invention generally relates to an exterior rearview mirror assembly for a motor vehicle. More particularly, the invention relates to an exterior rearview mirror assembly for a motor vehicle having two reflective surfaces contained on one backing plate.

2. Description of the Related Art

Rearview mirror assemblies have a number of features. Such features include heated glass, side markers, turn signals, secondary spotter mirrors, courtesy lamps, blind spot detection, and the like. Typically, several of these optional features are selected when manufacturing a rearview mirror assembly for a particular vehicle.

A difficulty arises when a composite mirror, e.g., a primary mirror combined with a secondary spotter mirror, is combined into one mirror assembly utilizing one glass holder or backing plate. The problem relates to having two surfaces. One solution to attaching both surfaces is to have a separate carrier with adhesive on both sides to secure each of the reflective surfaces. This carrier could be mylar, foam or a heater element. Having multiple components with adhesive is, however, not desirable for several reasons, including requiring inventory for multiple parts, the manufacturing of complex heating elements, as well as difficulty in providing electrical current to the additional heater and the complexity of the manufacturing process of the entire mirror assembly.

SUMMARY OF THE INVENTION

An exterior rearview mirror assembly for a motor vehicle includes a housing defining an interior and including a mirror opening oriented rearward when the exterior rearview mirror assembly is secured to the motor vehicle. A backing plate is operatively connected to the housing in the interior. The backing plate is selectively movable within the housing. A primary mirror is fixedly secured to a first portion of the backing plate. A secondary mirror is fixedly secured to a second portion of the backing plate. The secondary mirror is spaced apart from the primary mirror. A single adhesive member extends between the backing plate and the primary and secondary mirrors such that the single adhesive member secures the primary and secondary mirrors to the backing plate.

BRIEF DESCRIPTION OF THE DRAWINGS

Advantages of the invention will be readily appreciated as the same becomes better understood by reference to the following detailed description when considered in connection with the accompanying drawings, wherein:

FIG. 10 is an exploded, perspective view, partially cut away, of a portion of the rearview mirror assembly detailing still another alternative embodiment of the invention.

DETAILED DESCRIPTION OF THE PREFERRED EMBODIMENT

Figure 1:
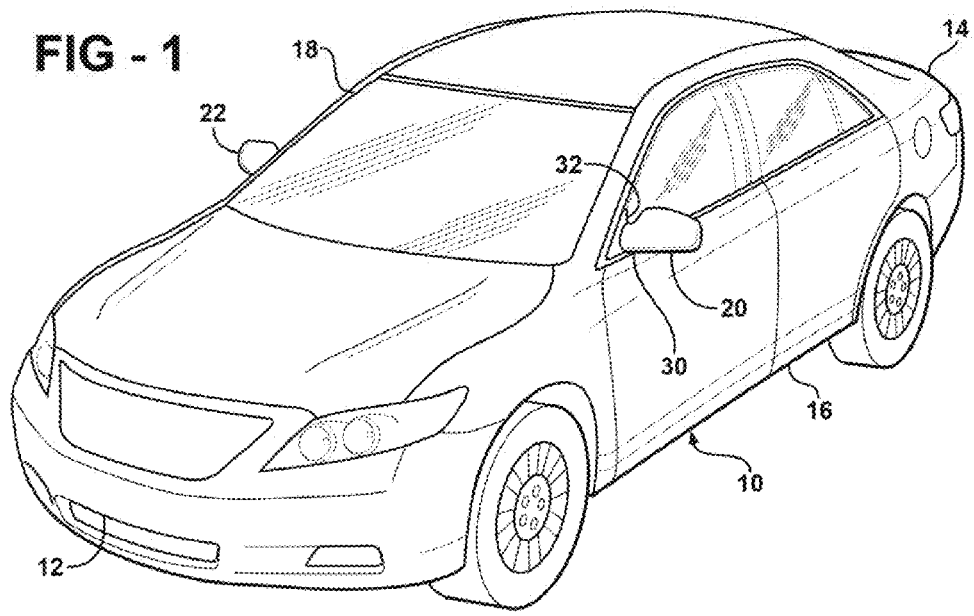
FIG. 1 is a perspective view of a motor vehicle incorporating one embodiment of the invention.

Referring to FIG. 1, a motor vehicle 10 is shown having a front side 12, a rear side 14 and two lateral sides 16, 18 commonly referred to as the driver side 16 and the passenger side 18. The motor vehicle 10 includes an exterior rearview mirror assembly 20 fixedly secured to the driver side 16. In the embodiment shown in FIG. 1, the motor vehicle 10 includes a second exterior rearview mirror assembly 22 that is fixedly secured to the passenger side 18. Because the invention relates to the exterior rearview mirror assemblies 20, 22, the remainder of the discussion regarding the invention will refer to the exterior rearview mirror assembly 20 that is fixedly secured to the driver side 16 of the motor vehicle 10, even though the exterior rearview mirror assembly 22 fixedly secured to the passenger side 18 of the motor vehicle 10 is substantially similar thereto.

Figure 2:
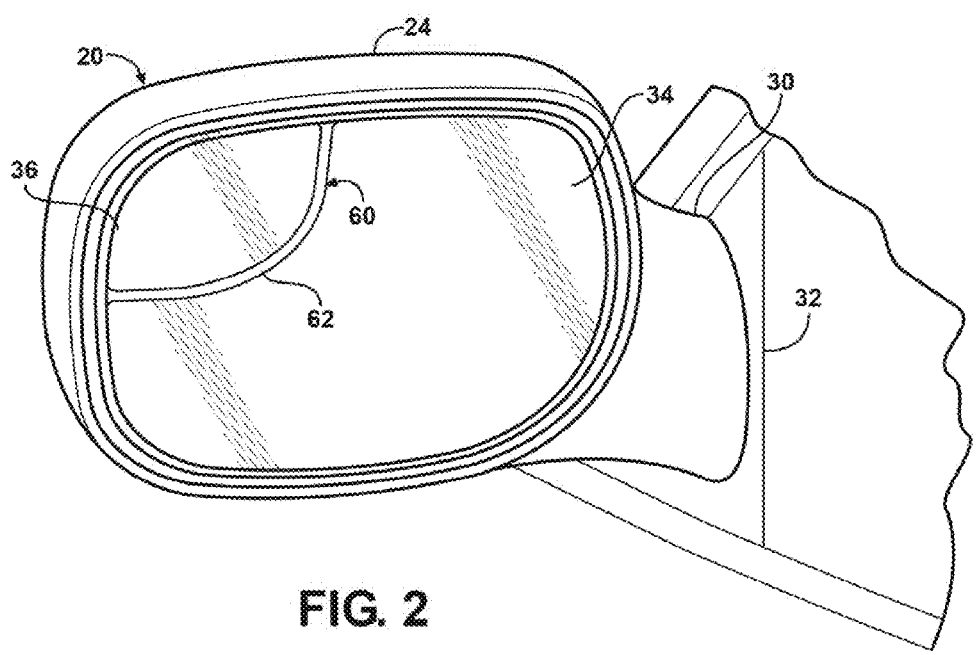
FIG. 2 is a perspective view of the invention with the motor vehicle partially cut away.
Figure 4:
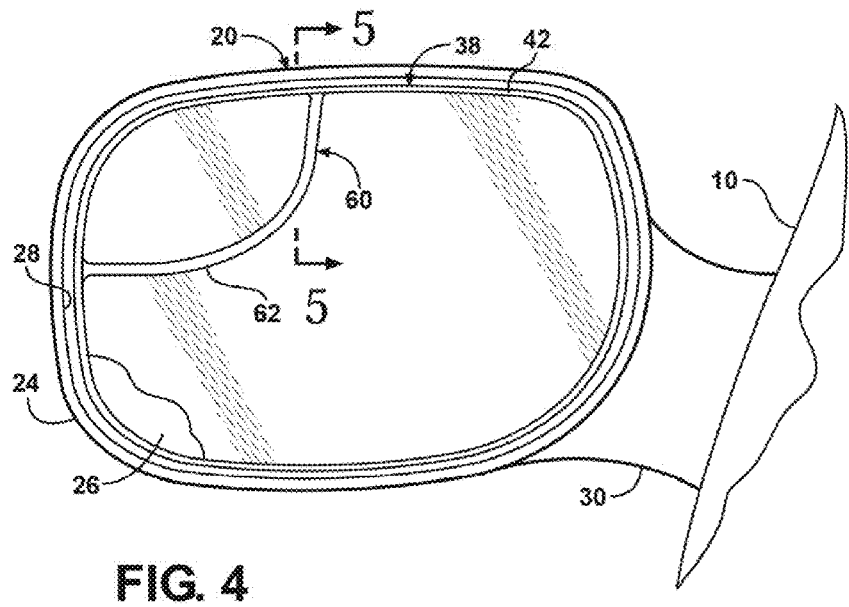
FIG. 4 is a rear side view of the invention fixedly secured to the motor vehicle, partially cut away.

Referring to FIGS. 2 and 4, the exterior rearview mirror assembly 20 includes a housing 24 having an interior 26 and a mirror opening 28. The mirror opening 28 is oriented rearward when the exterior rearview mirror assembly 20 is secured to the motor vehicle 10.

The exterior rearview mirror assembly 20 also includes a bracket 30 that extends between the housing 24 and the lateral side 16 of the motor vehicle 10. In the embodiment shown, the bracket 30 has a narrower profile than the housing 24. In other embodiments (not shown), the bracket 30 may resemble a mere extension of the housing 24. A sail (best seen in FIGS. 1 and 2) may be used to aesthetically and aerodynamically mount the exterior rearview mirror assembly 20 to the motor vehicle 10.

The exterior rearview mirror assembly 20 also includes a primary mirror 34 and a secondary mirror 36. The primary mirror 34 has a larger surface area than the secondary mirror 36. The primary mirror 34 provides most of the view for the operator of the motor vehicle 10 in the case of the driver side exterior rearview mirror assembly 20, the primary mirror 34 may be flat (having an infinite radius of curvature). In the case of the passenger side exterior rearview mirror assembly 22, there may be curvature to the primary mirror 34 defined by a radius of curvature which is less than infinite. It should be appreciated by those skilled in the art that in countries other than the United States, the primary mirror 34 on the driver side 16 may define a radius of curvature that is less than infinite rendering a curvature thereto. The primary mirror 34 in these instances may also be asymmetric.

In all instances, the secondary mirror 36 defines a curvature. The secondary mirror 36, also known as a spot mirror, is designed to assist the driver of the motor vehicle 10 to view areas surrounding the motor vehicle 10 not captured in the reflection generated by the primary mirror 34. These areas are typically referred to as "blind spots." The secondary mirror 36 may have a single radius of curvature or it may have multiple radii of curvature. In addition, the secondary mirror 36 may be oriented such that it is directed off axis of the primary mirror 34 assuming the primary mirror 34 may be defined by a single or principle axis.

A backing plate, generally shown at 38, is operatively connected to the housing 24 in the interior 26 thereof. The backing plate 38 is selectively movable within the housing 24.

Figure 3:
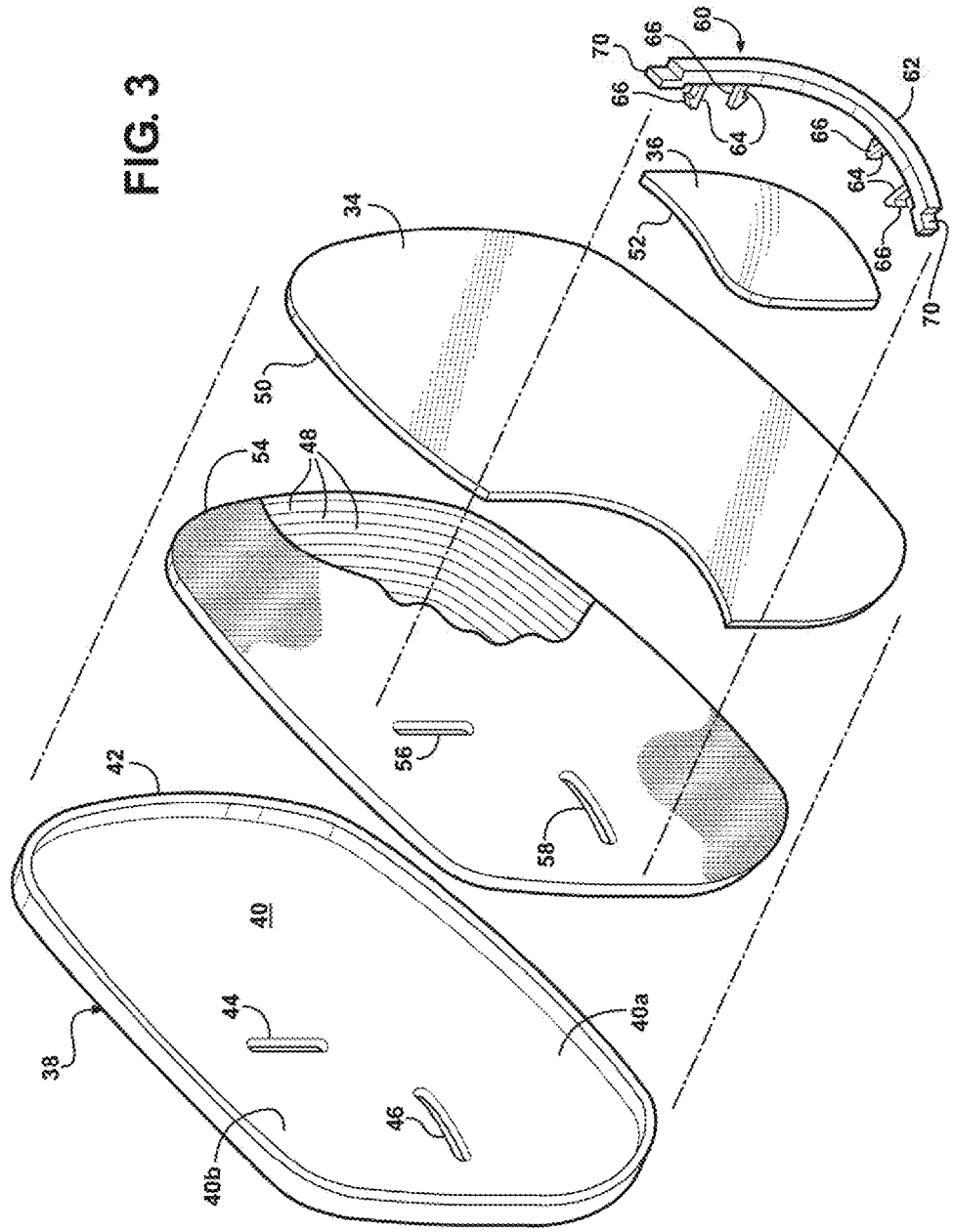
FIG. 3 is an exploded, perspective view, partially cut away, of a portion of the rearview mirror assembly.

The backing plate 38 is mounted to a motor mechanism that allows the operator of the motor vehicle 10 to adjust the orientation of the backing plate 38 from the interior of the passenger compartment of the motor vehicle 10. In some instances, the backing plate is pivoted remotely through a push-pull cable mechanism and a lever inside the passenger compartment or by simply manually moving the backing plate 38 with respect to the housing 24. The backing plate 38 includes a mirror receiving surface 40 and a backing plate rim 42. The mirror receiving surface 40 includes two retention holes 44, 46. In the embodiment shown in FIG. 3, the retention holes, 44, 46 are elongated, resembling slots. These slots 44, 46 may be linear or they may extend through a curved path. The mirror receiving surface 40 may be considered having two sections, the primary receiving surface 40a and the secondary receiving surface 40b.

The backing plate 38 is designed to receive the primary mirror 34 and the secondary mirror 36 and hold the mirrors 34, 36 in position relative to the backing plate 38 whereby no lost motion therebetween exists. The backing plate rim 42 protects the edges of the mirrors 34, 36 and may, in some embodiments, be used to snap fit the mirrors 34, 36 to the backing plate 38. In some embodiments, the backing plate rim 42 may otherwise be omitted.

A single adhesive member 48 extends between the backing plate 38 and the primary 34 and secondary 36 mirrors. The adhesive member 48 includes a first side adhesive 54a and a second side adhesive 54b and a carrier 54c. The carrier 54c may be fabricated from mylar, foam or a heater element. In the instance where the carrier 54c of the adhesive member 48 is a heating element, the adhesive member 48 heats all of the primary 34 and secondary 36 mirrors to remove condensation from the primary 34 and secondary 36 mirrors. The condensation is moisture that is collected on the surfaces of the primary 34 and secondary 36 mirrors. The condensation may be in the form of a liquid or a solid, i.e., frost or ice, when the ambient temperature is below freezing.

The single adhesive member 48 is used for covering the entire mirror receiving surface 40 and thus securing the entire back surfaces 50, 52 of the primary 34 and the secondary 36 mirrors respectfully to the backing plate 38. Using a single adhesive member 48 reduces inventory, complexity and manufacturing costs. It will also be understood by those skilled in the art that while the receiving surface 40 is shown as generally flat, it may in many cases be that the primary receiving surface 40a under the primary mirror 34 and the secondary receiving surface 40b under the secondary mirror 36 are on diverging planes.

The adhesive member 48 includes adhesive member holes 56, 58 extending through the adhesive member 48 and complementing the retention holes 44, 46 in the backing plate 38. More specifically, the adhesive member holes 56, 58 are designed to be aligned with the retention holes 44, 46 such that an element can extend through the adhesive member 48 and the backing plate 38. It is contemplated that the adhesive member holes 56, 58 are similar in shape and orientation as the retention holes 44, 46, respectfully.

A demarcation divider generally shown at 60 extends through the adhesive member holes 56, 58 and the retention holes 44, 46. The demarcation divider 60 separates the primary 34 and secondary 36 mirrors. The demarcation divider 60 includes a dividing body 62 and a plurality of extensions 64. The dividing body 62 is visible to the operator of the motor vehicle 10. The dividing body 62 is designed to provide a break between the primary 34 and secondary 36 mirrors so that the operator of the motor vehicle 10 can distinguish between viewing images reflected by the primary mirror 34 and the secondary mirror 36.

Figure 5:
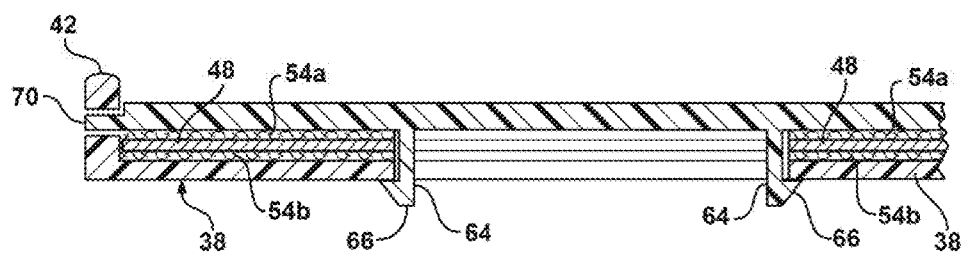
FIG. 5 is a cross-sectional view taken along lines 5-5 of FIG. 4.
Figure 6:
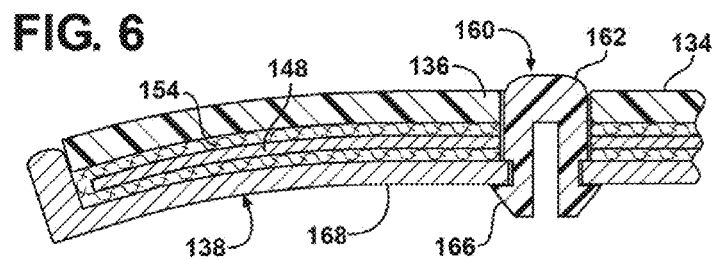
FIG. 6 through 9 are cross-sectional side views, partially cut away, of alternative embodiments of the invention.
Figure 7:
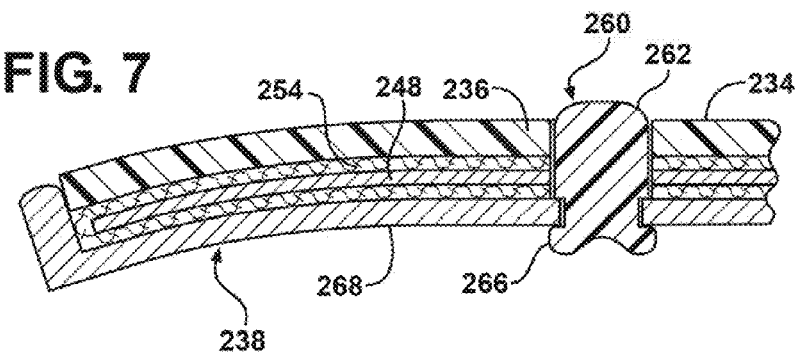
Figure 8:
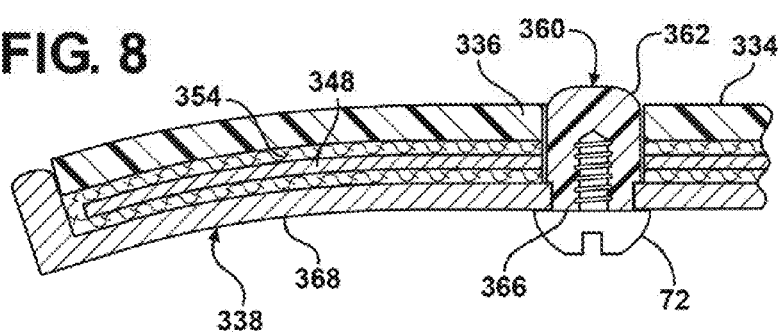
Figure 9:
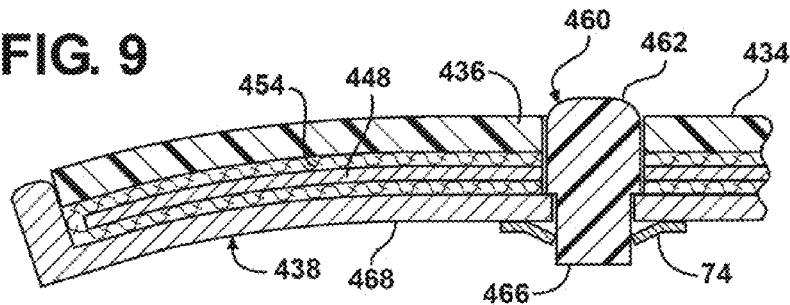

The plurality of extensions 64 extended down from the dividing body 62 such that the extensions 64 extend through the retention holes 44, 46 to secure the demarcation divider 60 to the backing plate 38. Each of the plurality of extensions 64 includes a distal end 66 designed to positively engage a back surface 68 of the backing plate 38. In the embodiment shown in FIG. 3, the demarcation divider 60 also includes end extension 70 disposed at either end of the dividing body 62. The end extensions 70 interlock with the backing plate rim 42 as is shown in FIG. 5. This provides further positive engagement with the backing plate 38 such that the demarcation divider 60 will not solely rely on the adhesive member 48 to secure the demarcation divider 60 to the exterior rearview mirror assembly 20. By physically securing the demarcation divider 60 to the backing plate 38, the adhesive member 48 may be designed with materials more suitable for securing the primary 34 and secondary 36 mirrors to the backing plate 38.

In operation, the method for fabricating the primary 34 and secondary 36 mirrors on a backing plate 38 includes the step of applying the adhesive member 48 to the backing plate 38. The demarcation divider 60 is secured to the backing plate 38 in a position allowing the demarcation divider 60 to separate the primary 34 and secondary 36 mirrors. The primary 34 and secondary 36 mirrors are affixed to the layer of adhesive 54a.

Referring to FIGS. 6 through 11, alternative embodiments are shown wherein the reference numerals of similar elements of the invention are offset from elements in the preferred embodiment discussed above, by multiple of 100. These alternative embodiments show different extensions 164, 264, 364, 464 as means for securing the demarcation divider 160, 260, 360, 460 to the backing plate 138, 238, 338, 448. These extensions 164, 264, 362, 464 include an alternative snap fit arrangement 164, heat staking 264, the use of a screw 72, and the use of a washer 74, respectively.

Figure 11:
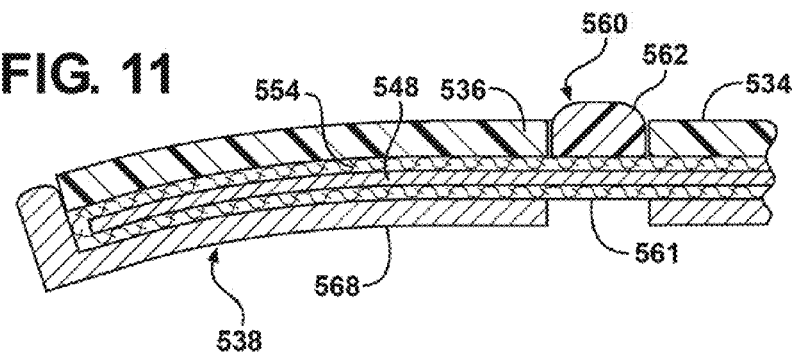
FIG. 11 is a cross sectional view of the embodiment shown in FIG. 10.

Turning attention specifically FIGS. 10 and 11, another embodiment of the invention includes the bridge 560, which is integrally formed or molded as a part of the backing plate 538. A gap 561 is thereby formed between bridge 560 and mirror receiving surface 540. Adhesive member 548 has an adhesive member slot 558 starting at an outboard edge 559 and extending inwardly along a path that complements a portion of the bridge 560 that does not extend over the gap 561. As such, the portion of the adhesive member 548 that is intended to reside under the secondary mirror 536 is free to liberally flex during installation and slide through the gap 561 that exists between bridge 560 and mirror receiving surface 540.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. An exterior rearview mirror assembly for a motor vehicle, said exterior rearview mirror assembly comprising:
   a housing defining an interior and including a mirror opening oriented rearward when said exterior rearview mirror assembly is secured to the motor vehicle;

a backing plate operatively connected to said housing in said interior, said backing plate selectively movable within said housing, said backing plate including a retention hole;

a primary mirror fixedly secured to a first portion of said backing plate;

a secondary mirror fixedly secured to a second portion of said backing plate, said secondary mirror spaced apart from said primary mirror; and a single adhesive member extending between said backing plate and both said primary and secondary mirrors such that said single adhesive member secures said primary and secondary mirrors to said backing plate, wherein said adhesive member defines an adhesive member elongated slot extending therethrough at a location disposed adjacent each of said primary mirror and said secondary mirror; and a demarcation divider extending through said adhesive member elongated slot in said adhesive member and through said retention hole in said backing plate, said demarcation divider separating said primary and secondary mirrors.

2. An exterior rearview mirror assembly as set forth in claim 1 wherein said demarcation divider interlocks with said backing plate.

3. An exterior rearview mirror assembly as set forth in claim 2 wherein said backing plate includes a rim extending about a periphery of said backing plate.

4. An exterior rearview mirror assembly as set forth in claim 3 wherein said demarcation divider includes a dividing body and extensions extending down from said dividing body such that said extensions extend through said retention hole to secure said demarcation divider to said backing plate.

5. An exterior rearview mirror assembly as set forth in claim 4 wherein said demarcation divider includes end extensions interlocking with said rim of said backing plate.

6. An exterior rearview mirror assembly for a motor vehicle, said exterior rearview mirror assembly comprising:

a housing defining an interior and including a mirror opening oriented rearward when said exterior rearview mirror assembly is secured to the motor vehicle;

a backing plate operatively connected to said housing in said interior, said backing plate selectively movable within said housing;

a primary mirror fixedly secured to a first portion of said backing plate;

a secondary mirror fixedly secured to a second portion of said backing plate, said secondary mirror spaced apart from said primary mirror; and a single adhesive member extending between said backing plate and both said primary and secondary mirrors such that said single adhesive member secures said primary and secondary mirrors to said backing plate, wherein said adhesive member defines an adhesive member slot extending from an edge inwardly therefrom at a location disposed adjacent each of said primary mirror and said secondary mirror; and a demarcation divider extending up from said backing plate such that said demarcation divider separates said primary and secondary mirrors.

7. An exterior rearview mirror assembly as set forth in claim 6 wherein said demarcation divider defines a gap between said demarcation divider and said backing plate to allow a portion of said adhesive member along said slot to extend therethrough such that said adhesive member is fixedly secured to said backing portion without it extending over said demarcation divider.

8. A method for fabricating a primary mirror and secondary mirror on a backing plate using an adhesive member and a demarcation divider, the method comprising the steps of:

applying the adhesive member to the backing plate;

securing the demarcation divider to the backing plate in a position allowing the demarcation divider to separate the primary and secondary mirrors;

affixing the primary and secondary mirrors to the layer of adhesive; and securing includes the step of snapping the demarcation divider into the backing plate.

9. A method for using an adhesive layer to secure a primary mirror and secondary mirror onto a backing plate having a demarcation divider defining a gap between the backing plate and the demarcation divider, the method comprising the steps of:

sliding a portion of the adhesive layer through the gap between the backing plate and the demarcation divider;

applying the adhesive member to the backing plate on either side of the demarcation divider; and affixing the primary and secondary mirrors to the adhesive layer on such that the primary mirror is secured to the backing plate on one side of the demarcation divider and the secondary mirror is secured to the backing plate on the other side of the demarcation divider.

* * * * *